(12) United States Patent
Iwahashi

(10) Patent No.: US 6,933,998 B1
(45) Date of Patent: Aug. 23, 2005

(54) DISPLAY DEVICES WITH INTEGRATED CONTROL ELEMENTS AND METHODS OF MAKING DEVICES

(75) Inventor: Masanori Iwahashi, Mihama-ku (JP)

(73) Assignee: Kawasaki Microelectronic, Inc., Chiba (JP)

( * ) Notice: Subject to any disclaimer, the term of this patent is extended or adjusted under 35 U.S.C. 154(b) by 178 days.

(21) Appl. No.: 09/718,346

(22) Filed: Nov. 24, 2000

(30) Foreign Application Priority Data

Dec. 1, 1999 (JP) .......................................... 11-341650

(51) Int. Cl.$^7$ .......................................... G02F 1/1343
(52) U.S. Cl. ...................... 349/143; 359/291; 359/292; 349/146; 353/69
(58) Field of Search ................................ 359/291–292; 349/146, 137, 145; 353/69; 345/84; 6/41

(56) References Cited

U.S. PATENT DOCUMENTS

| | | | | |
|---|---|---|---|---|
| 4,519,678 A | * | 5/1985 | Komatsubara et al. ...... | 349/160 |
| 4,641,193 A | * | 2/1987 | Glenn ......................... | 348/771 |
| 4,950,058 A | * | 8/1990 | Diem et al. ................. | 349/143 |
| 4,986,637 A | * | 1/1991 | Yamaguchi ................. | 349/109 |
| 5,061,049 A | | 10/1991 | Hornbeck | |
| 5,144,288 A | * | 9/1992 | Hamada et al. ............. | 349/109 |
| 5,146,356 A | * | 9/1992 | Carlson ....................... | 349/38 |
| 5,311,337 A | * | 5/1994 | McCartney, Jr. ............ | 349/145 |
| 5,312,779 A | * | 5/1994 | Nelson ........................ | 438/16 |
| 5,355,251 A | * | 10/1994 | Parks .......................... | 359/354 |
| 5,387,838 A | * | 2/1995 | Hirakawa et al. ........... | 313/496 |
| 5,442,414 A | * | 8/1995 | Janssen et al. .............. | 353/98 |
| 5,510,824 A | * | 4/1996 | Nelson ........................ | 347/239 |
| 5,526,149 A | * | 6/1996 | Kanbe et al. ............... | 349/113 |
| 5,594,564 A | * | 1/1997 | Ishimoto et al. ............ | 349/143 |
| 5,597,737 A | * | 1/1997 | Greer et al. ................. | 438/17 |
| 5,608,468 A | * | 3/1997 | Gove et al. ................. | 348/771 |
| 5,661,591 A | * | 8/1997 | Lin et al. .................... | 359/290 |
| 5,719,695 A | * | 2/1998 | Heimbuch ................... | 359/291 |
| 5,754,217 A | * | 5/1998 | Allen .......................... | 347/239 |
| 5,757,054 A | | 5/1998 | Miyawaki et al. | |
| 5,757,444 A | * | 5/1998 | Takemura .................... | 349/38 |
| 5,847,684 A | * | 12/1998 | Strik ........................... | 345/58 |
| 6,049,132 A | | 4/2000 | Iwahashi et al. | |
| 6,281,861 B1 | * | 8/2001 | Harrold ....................... | 345/32 |
| 6,549,179 B2 | * | 4/2003 | Youngquist et al. ......... | 345/39 |
| 6,709,113 B2 | * | 3/2004 | Segler et al. ................ | 353/69 |
| 6,798,475 B2 | * | 9/2004 | Ho et al. ..................... | 349/113 |

FOREIGN PATENT DOCUMENTS

| | | | | |
|---|---|---|---|---|
| JP | 63293528 A | * | 11/1988 | .......... G02F/1/133 |
| JP | 08334770 A | * | 12/1996 | ......... G02F/1/1337 |

* cited by examiner

Primary Examiner—Kenneth Parker
(74) Attorney, Agent, or Firm—Oliff & Berridge, PLC

(57) ABSTRACT

A display device includes an array of control elements formed on a semiconductor substrate, and an array of reflective-type pixel electrodes stacked over the array of the control elements, so that each of the control elements control a state of reflection of a corresponding one of the pixel electrodes. The array of the pixel electrodes is arranged in rows and columns. In embodiments, the array of the control elements is arranged in a first direction that makes an angle greater than zero and smaller than 90° with the direction of rows, and in a second direction that is perpendicular to the first direction. The display device has an array of control elements corresponding to the array of pixel electrodes even when the control elements do not match the pixel electrodes in shape. This invention also provides methods of making the display devices.

15 Claims, 8 Drawing Sheets

18 COLUMN DRIVE LINE
16 ROW DRIVE LINE

DISPLAY DEVICES WITH INTEGRATED CONTROL ELEMENTS AND METHODS OF MAKING DEVICES

BACKGROUND OF THE INVENTION

1. Field of Invention

This invention relates to display devices. This invention also relates to methods of making display devices.

2. Description of Related Art

Transmission-type, liquid-crystal display devices are currently the main stream of the liquid-crystal display devices. These devices require a back-light source on the back of the liquid crystal, the devices consume large amounts of power. In contrast, reflective-type, liquid-crystal display devices display an image by reflecting a light ray incident on the devices from an external light source, such as sunlight or room illumination, and thereby need no back-light source that consumes substantial power. Because of this feature, reflective-type, liquid-crystal displays operate on a substantially smaller power consumption level, and are thus expected to be incorporated in electronics used outdoors, such as portable telephones or portable information terminals.

In addition, reflective-type display devices have already found applications in projectors that use an external light source. A high-resolution feature is required for a display device that is incorporated in a projector. As the display device becomes high in resolution, the size of a unit pixel becomes small. For instance, a diagonally 0.9 inch VGA (video graphics array) display of 640×480 (307,200) pixels has a pixel size of about 28.6 $\mu$m. A SVGA (super video graphics array) display of 800×600 (480,000) pixels has a pixel size of 22.9 $\mu$m; an XGA (extended graphics array) display of 1024×768 (786,432) pixels has a pixel size of 17.8 $\mu$m; and a UXGA (ultra high extended graphics array) display of 1600×1200 (1920,000) pixels has a pixel size of 11.4 $\mu$m.

Reflective-type, liquid-crystal display devices are constructed by successively stacking a transparent electrode, a liquid crystal, an array of pixel electrodes that reflect incident light from an external light source, and an array of control elements for controlling the alignment of the liquid crystal on the respective pixel electrodes. An example of the construction of reflective-type, liquid-crystal display device is described in U.S. Pat. No. 6,049,132, which was co-invented by this inventor, hereby incorporated by reference in its entirety. Further, an example of the construction of a projector using reflective-type display devices is described in U.S. Pat. No. 5,757,054, hereby incorporated by reference in its entirety.

A disadvantage of the conventional reflective-type display device is discussed with reference to FIGS. 11–13.

FIG. 11 is a circuit diagram showing a portion of a conventional liquid-crystal display device including four rows by four columns of control elements. Each of the control elements 14 includes a switching circuit 28 including a PMOS transistor 24 and an NMOS transistor 26 connected in parallel. The pixel electrode, the liquid crystal, and the transparent electrode are connected between one terminal of the switching circuit 28 and the ground.

The gate of the PMOS transistor 24 and the gate of the NMOS transistor 26 are respectively connected to a pair of row drive lines 16 in each switching circuit 28 in the direction of the row, i.e., the horizontal direction in FIG. 11, in the control element 14. Each switching circuit 28 in the direction of the column, i.e., in the vertical direction, is configured with one terminal thereof connected to the respective pixel electrodes and the other terminal commonly connected to a column drive line 18.

FIG. 12 shows the layout of the display device of FIG. 11. FIG. 13A and FIG. 13B respectively show the layout and the circuit diagram of a single pixel. The shape of the unit pixel is typically square, although rectangular-shaped pixels with various aspect ratios may be utilized depending on the intended use. In any case, an aspect ratio of the pixel, or a ratio between the horizontal and vertical pitches of the pixel electrodes, may not be arbitrary determined, but is determined by the intended use. To configure the unit pixel in a square, or a fixed aspect ratio rectangular shape, the area of each control element should also be designed in the square shape, or in the fixed aspect ratio rectangular shape.

In many cases, a liquid-crystal display device requires higher operation voltage than the operation voltage of standard logic devices to drive a liquid crystal. Therefore, it is difficult to miniaturize the control element beneath the layer of the pixel electrode. Further, the square, or the fixed aspect ratio rectangular shape, of the pixel adds to the difficulty of miniaturizing the pixel. That is, when a practically available transistor design rule is implemented, a layout with a minimum space may require a rectangular area that does not match the shape of the pixel electrode. This presents difficulty in design of the control elements with a minimum area.

SUMMARY OF THE INVENTION

Accordingly, it is an object of this invention to provide display devices, which overcome above-described disadvantages of known display devices.

It is a further object of this invention to provide display devices that include an array of control elements corresponding to an array of pixel electrodes even when the shape of an area to form a control element does not match the shape of the pixel electrodes.

Exemplary embodiments of the display devices according to this invention comprise: a semiconductor substrate; an array of control elements formed on the semiconductor substrate; and an array of reflective pixel electrodes arranged in rows and columns, the array of pixel electrodes is stacked over the array of control elements so that each of the control elements controls a state of reflection of a corresponding one of the pixel electrodes. In the display devices, the control elements are arranged in a first direction that makes an angle greater than zero and smaller than a right angle with a direction of the rows, and in a second direction perpendicular to the first direction.

Preferably, the state of reflection is controlled by one of (i) controlling alignment of a liquid-crystal layer disposed over the corresponding one of the pixel electrodes, and (ii) controlling an angle of the corresponding one of the pixel electrodes.

Preferably, embodiments of the display devices further comprise a converter. The converter receives a video signal including a series of image data in an order corresponding to the rows and columns of the pixels electrodes, and converts the order of the series of image data in the received video signal in accordance with correspondences between rows and columns of the array of control elements and the rows and columns of the pixel electrodes. Preferably, the array of control elements includes first drive lines extending in the first direction and second drive lines extending in the second direction.

Preferably, the array of control elements includes row drive lines extending in a direction of the rows of the array of the pixel electrodes, and column drive lines extending in a direction of the columns of the array of the pixel electrodes.

Other exemplary embodiments of the display devices according to this invention comprise: a semiconductor substrate; an array of control elements arranged in rows and columns formed on the semiconductor substrate; and an array of reflective pixel electrodes arranged in rows and columns with a first pitch and a second pitch. The array of pixel electrodes is stacked over the array of control elements so that each of the control elements controls a state of reflection of a corresponding one of the pixel electrodes. The control elements are arranged in same directions of the rows and columns of the pixel electrodes with a third pitch different from the first pitch, a fourth pitch different from the second pitch, and a product of the first and the second pitches equal to a product of the third and the fourth pitches.

Preferably, the state of reflection is controlled by one of (i) controlling an alignment of a liquid-crystal layer disposed over the corresponding one of the pixel electrodes, and (ii) controlling an angle of the corresponding one of the pixel electrodes.

This invention also provides embodiments of methods of forming the display devices.

DETAILED DESCRIPTION OF PREFERRED EMBODIMENTS

This invention was first disclosed in Japanese Patent Application No. 11-341650, which is hereby incorporated by reference in its entirety.

Preferred embodiments of the display devices of this invention are discussed below with reference to the drawings.

Figure 1:
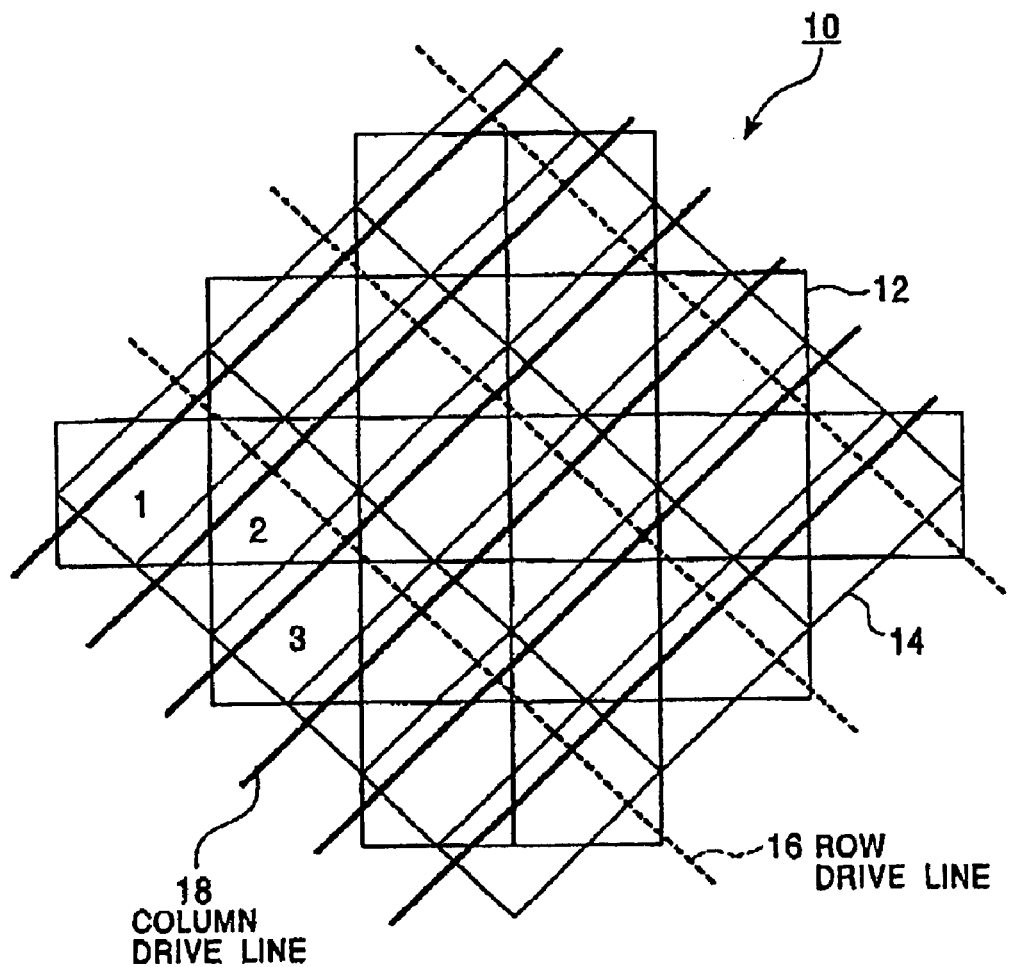
FIG. 1 illustrates an embodiment of a display device according to this invention.
Figure 2:
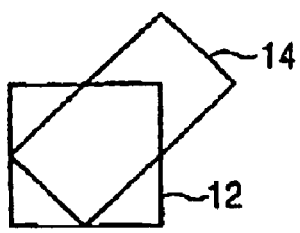
FIG. 2 illustrates the positional relationship between a pixel electrode and a control element in a single pixel in the display device of FIG. 1.

FIG. 1 is a conceptual view of an exemplary embodiment of the display devices of this invention. FIG. 2 is a conceptual view showing the positional relationship between a pixel electrode and a control element in a single pixel in the display device of FIG. 1. In these views, squares and rectangles represent pixel electrodes and control elements, respectively. The squares and rectangles shown in FIGS. 1 and 2 represent areas to form the pixel electrode and the control element, and the pixel electrode and the control element may actually have various structures formed within respective areas.

Referring to FIG. 1, a display device 10 of this invention includes, on a semiconductor substrate (not shown), an array of a plurality of reflective-type pixel electrodes 12 for reflecting incident light, and an array of a plurality of control elements 14, stacked correspondingly below the plurality of the pixel electrodes 12, for controlling the state of reflection of light from the plurality of the pixel electrodes 12.

Figure 11:
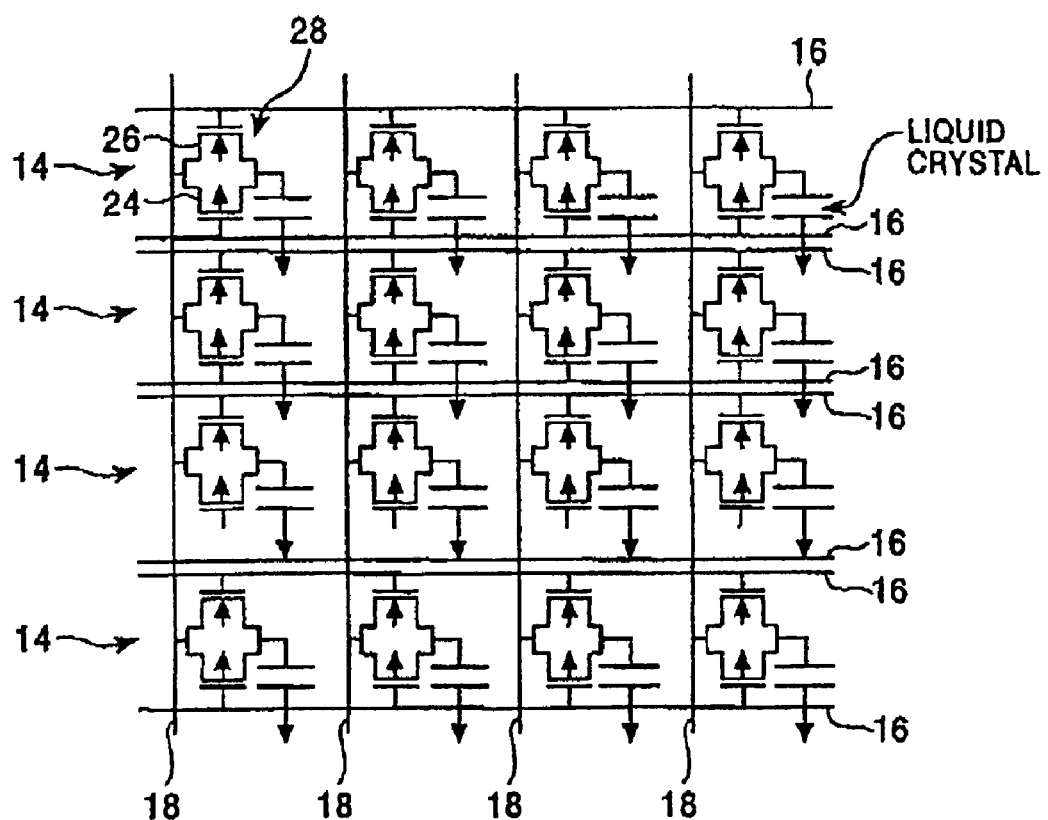
FIG. 11 is a circuit diagram showing the construction of a conventional display device.

In this embodiment, each pixel electrode 12 is formed in a square region. That is, the pixel electrodes 12 are arranged with the same pitch in the direction of rows (i.e., in the horizontal direction in FIG. 1) and in the direction of columns (i.e., in the vertical direction in FIG. 1). The control elements 14 are arranged with different pitches, one pitch in a first direction angled at 45° to the direction of rows, and with the other pitch in a second direction perpendicular to the first direction. Row drive lines and column drive lines are respectively arranged in the first direction and the second direction. Although each two row drive lines 16 may be paired together as shown in FIG. 11, only a single row drive line is shown in FIG. 1 for each row of the control elements 14 for simplicity.

Referring to FIG. 2, the pixel electrode 12 is formed in a square region having an aspect ratio of 1:1, while the control element 14 is formed in a rectangular region having an aspect ratio of 2:1. The areas of the two regions are equal to each other. In this embodiment, the aspect ratio of the area for forming the control elements 14 is 2:1, and the area is angled at 45° to the pixel electrodes 12. Depending on the aspect ratio of the control element 14, the inclination angle of the control element 14 to the pixel electrode 12 may be selected to be any angle within a range greater than zero and smaller than a right angle (i.e., 90°).

Figure 3:
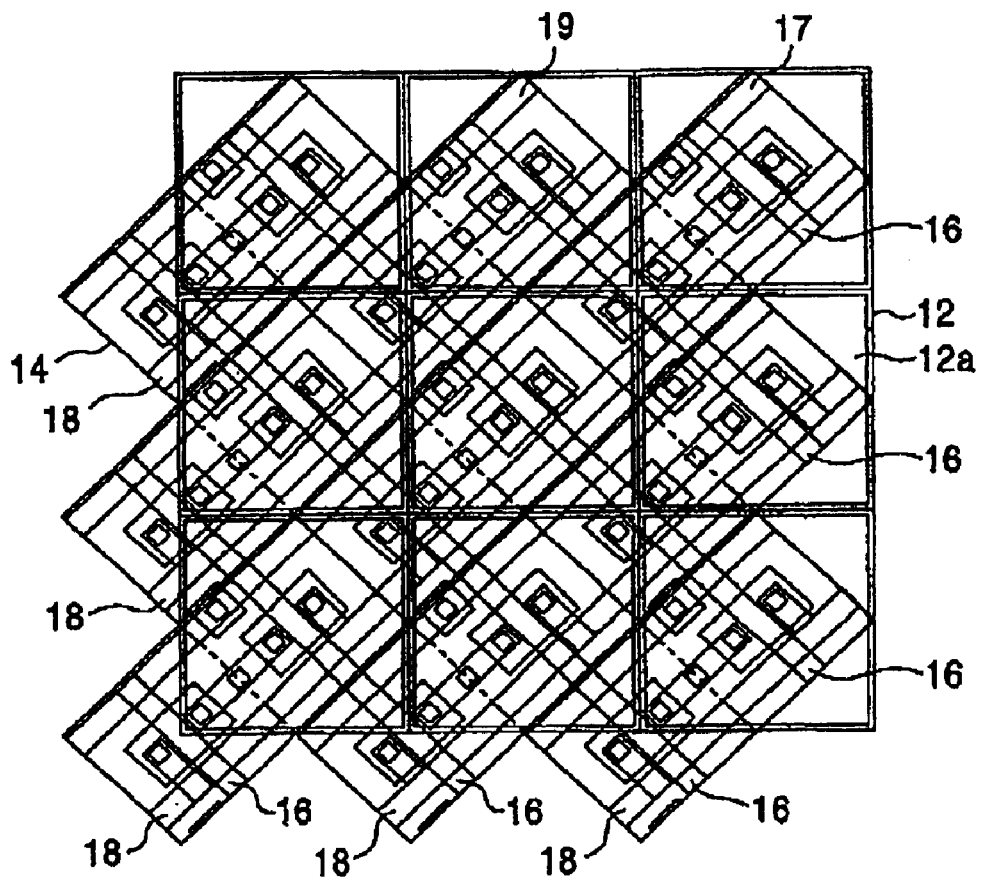
FIG. 3 is a layout view of the display device of FIG. 1.
Figure 4:
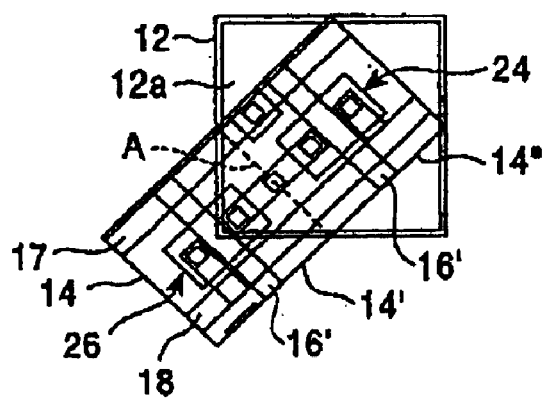
FIG. 4 is a layout view showing the positional relationship between a pixel electrode and a control element in a single pixel in the display device of FIG. 3.

FIG. 3 is a layout view of the display device of FIG. 1. FIG. 4 is a layout view showing the positional relationship between a pixel electrode and a control element in a single pixel in the display device of FIG. 3. In these layout views, structures of the pixel electrode and the control element formed within the areas 12 and 14 shown in the views of FIGS. 1 and 2 are shown. As shown, nine control elements 14 are respectively arranged for an array of 3×3 pixel electrodes 12. The row drive lines 16 and the column drive lines 18 are respectively arranged in the first direction and in the second direction. That is, in this embodiment, the row drive lines 16 extend in the direction of rows of the array of control elements 14, which is inclined from the direction of rows of the array of pixel electrodes 12. Similarly, the column drive lines 18 extend in the direction of columns of the array of control elements 14, which is inclined from the direction of columns of the array of pixel electrodes 12.

Referring to FIG. 4, the rectangular region 14 forming the control element is separated in two square regions by a center line represented by the broken line A. The lower-left one of these square regions 14' is a P-well region, and an NMOS transistor 26 is formed in a central, rectangular area in the lower-left square region. The upper-right square region 14" is an N-well region, and a PMOS transistor 24 is formed in a central, rectangular area in the upper-right square region. Lines 16' diagonally extending from the upper left to the lower right respectively serve as gates of the transistors. The gates of the plurality of control elements are connected and form the row drive lines 16. The lower one 18 of two lines extending over the control element 14 diagonally from the upper right to the lower left serves as the column drive line. The PMOS and NMOS transistors are configured with one of the sources and drains thereof connected to the column drive line, and with the other of the sources and drains thereof connected together to the pixel electrode at the center of the control element 14. The upper one 17 of two lines diagonally extending over the control element 14 from the upper right to the lower left serves as a line for supplying a power supply potential to the well. FIG. 4 shows the line 17 that supplies an N wall with a Vdd power supply potential. A line 19 for supplying a P well with a ground potential is arranged within the region of another control element as shown in FIG. 3.

In the square area 12, a square shaped pixel electrode 12*a* is formed using a substantial portion of the square area 12. In a reflective-type liquid-crystal display device, a fixed metal electrode is formed as the pixel electrode.

In this invention, the array of the control elements 14 is arranged correspondingly to the array of the pixel electrodes 12, even if the control elements 14 fail to match the pixel electrodes 12 in shape. That is, this invention may be implemented in any reflective-type display device, such as a reflective-type, liquid-crystal display device, or in a digital micro-mirror device. In the digital micro-mirror device, a movable mirror is formed as the pixel electrode, and the angle of the movable pixel electrode controls the state of reflection of the pixel electrode. An example of the construction of the digital micro-mirror device is described in U.S. Pat. No. 5,061,049, hereby incorporated by reference in its entirety.

The arrangement of the control elements shown in FIG. 3 is actually different from the arrangement shown in FIG. 1. That is, in FIG. 1, columns of control elements 14 are aligned in the direction of the rows (the first direction). In FIG. 3, adjacent columns of control elements 14 are shifted from each other by a half of the pitch in the direction of the column (the second direction). Either arrangement can be provided in this invention.

Figure 12:
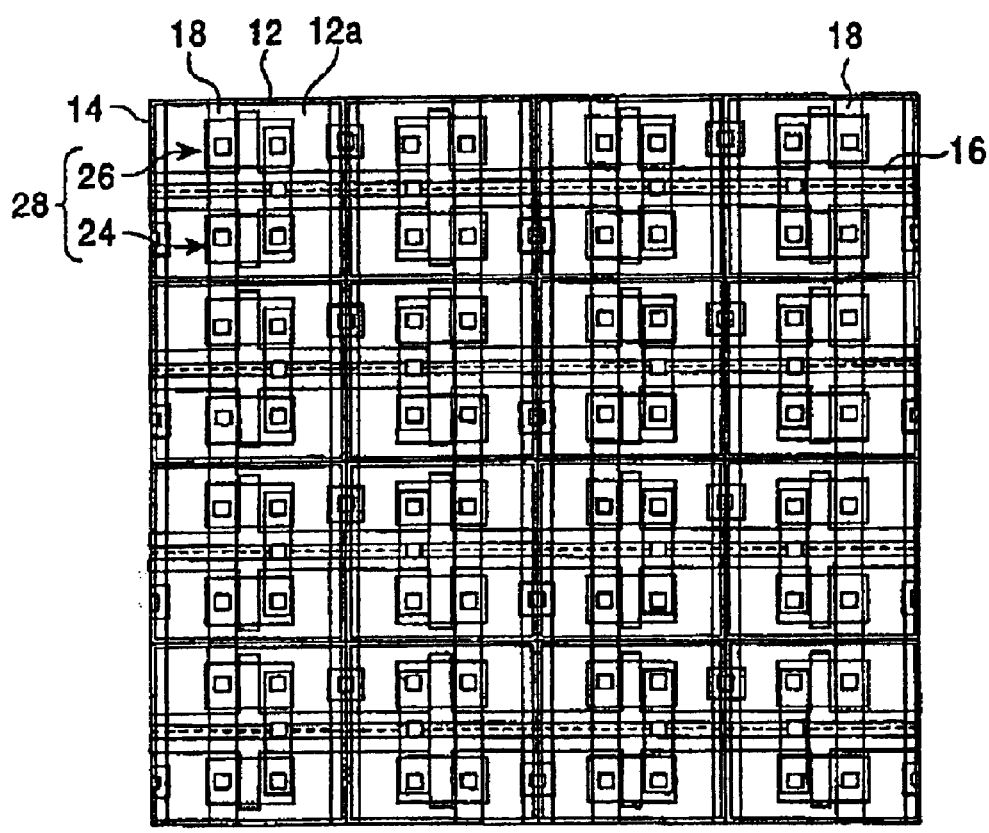
FIG. 12 is a layout view of the display device of FIG. 11.
Figure 13A:
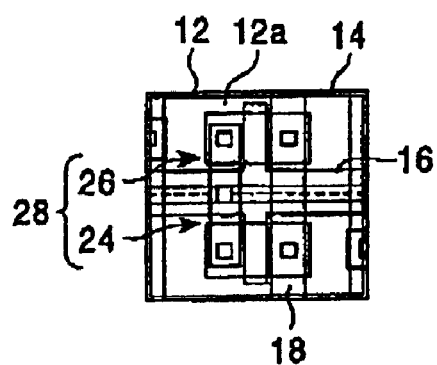
FIGS. 13A and 13B show a layout view and a circuit diagram, respectively, of a single pixel of the display device of FIG. 11.
Figure 13B:
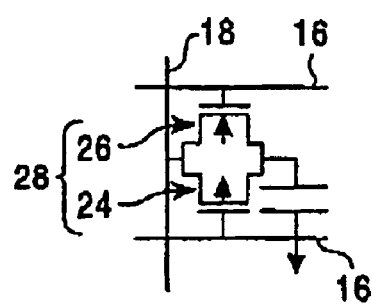

To display an image corresponding to a video signal, a display device successively selects one of the row drive lines while scanning the column drive lines, and thereby successively selects control elements at intersections of the selected row drive line and the column drive line. A series of image data is synchronously applied to the column drive lines. In a conventional display device, such as shown in FIGS. 11 and 12, row drive lines 16 and column drive lines 18 of the array of control elements 14 extend in the directions of the rows and columns of the array of pixel electrodes 12. That is, rows and columns of the pixel electrodes 12 directly correspond to the row and column drive lines 16 and 18 of the control elements 14. Therefore, by applying video data including a series of image data in an ordinary order, i.e., in an order corresponding to the rows and columns of the pixel electrodes, the image is properly displayed.

In a display device 10 according to this invention, such as shown in FIGS. 1 and 3, however, the correspondence between the rows and columns of the pixel electrodes 12 and the row and column drive lines 16 and 18 is different from that in the conventional display device, such as shown in FIGS. 11 and 12. That is, the row drive line 16 extends in the direction of the row of control elements 12, and not in the direction of the row of pixel electrodes 12; and the column drive line 18 extends in the direction of the column of the control elements 14, and not in the direction of the column of the pixel electrode 12. Therefore, control elements 14 are selected, and thus pixel electrodes 12 are controlled, by the row and column drive lines 16 and 18 in an order of elements 1→element 2→element 3 as shown in FIG. 1. Because this scanning order is different from the standard scanning order, the order of the image data should be modified so that the image is properly displayed.

For example, a conversion circuit (not shown) is integrated on the same semiconductor substrate. The conversion circuit receives a video signal including a series of image data in an order corresponding to the rows and columns of the pixel electrodes 12, and converts the order in accordance with the correspondences between the row and column drive lines 16 and 18, or the rows and columns of the control elements 14, and the rows and columns of the pixel electrodes 12. Alternatively, matching between the order of image data and the order of scanning is achieved by arranging the row drive lines 16 and the column drive lines 18, as explained in detail below with reference to FIGS. 5–7.

Figure 5:
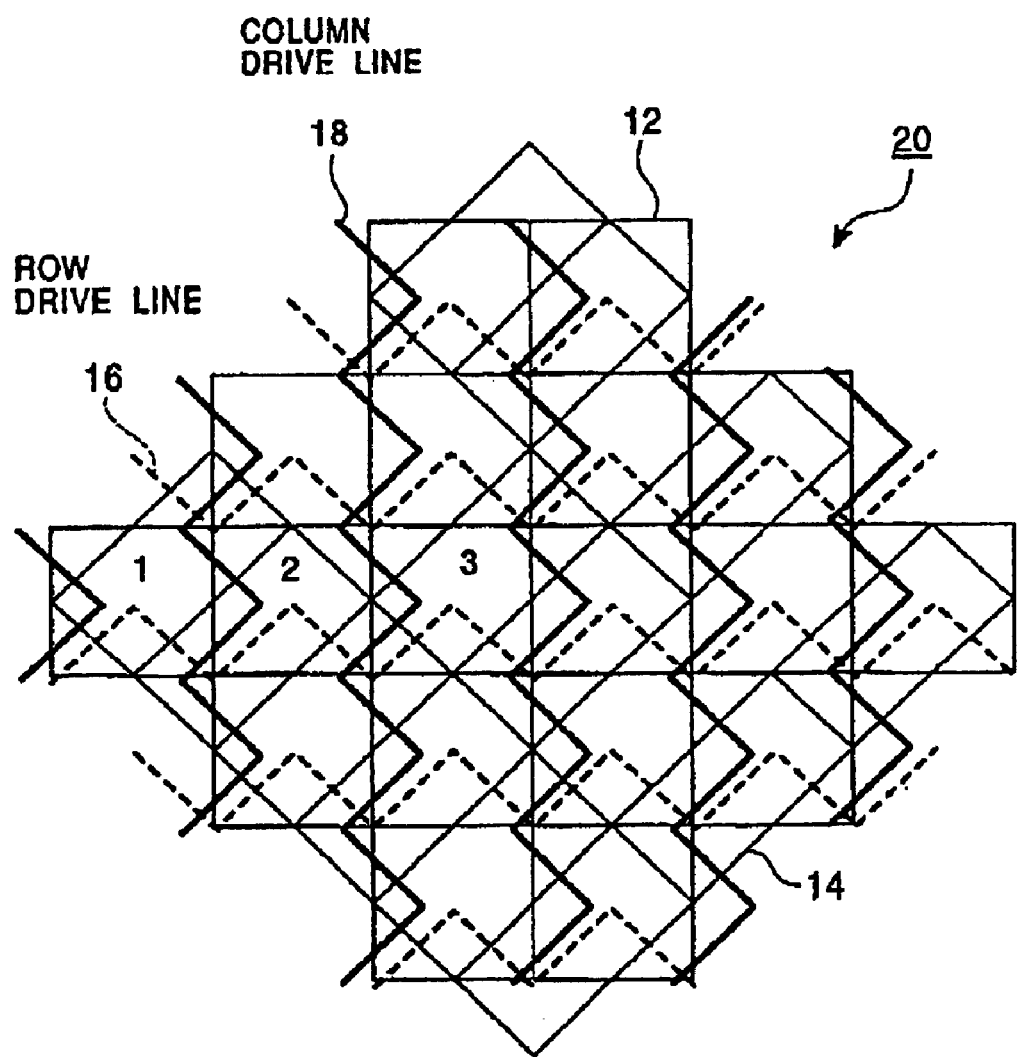
FIG. 5 shows a wiring configuration of a display device according to this invention.

FIG. 5 shows a conceptual view of another exemplary embodiment of the wiring configuration of the display device of this invention. Referring to FIG. 5, a display device 20 includes row drive lines and column drive lines which respectively extend in a zigzag fashion in the directions of rows and columns of the pixel electrodes 12. Each two rows drive lines 16 may be paired as shown in FIG. 11 (FIG. 5 shows only a single row drive line 16 for each control element 14 for simplicity).

Figure 6:
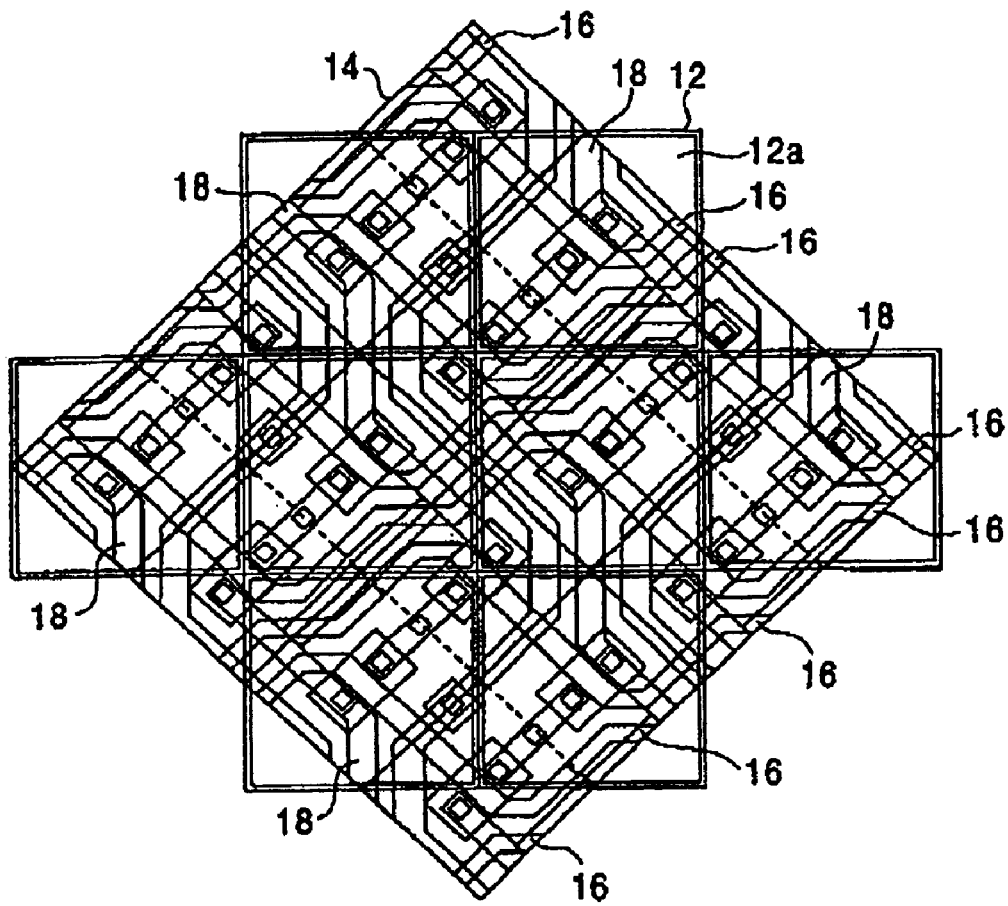
FIG. 6 is a layout view showing a wiring configuration of the display device of FIG. 5.
Figure 7:
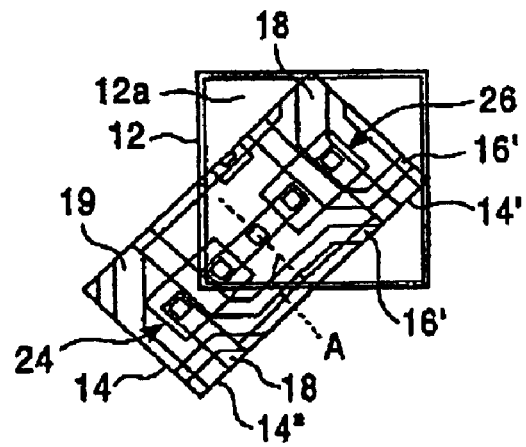
FIG. 7 is a layout view showing the wiring configuration and the positional relationship between the a pixel electrodes and a control element in the display device of FIG. 6.

The layout configuration is now specifically described. FIG. 6 is a layout view showing another wiring configuration of the display device corresponding to the conceptual view of FIG. 5. FIG. 7 is a layout view showing the wiring configuration and the positional relationship between a pixel electrode 12 and a control element 14 in the display device of FIG. 6. The structure within the control element 14 shown in FIG. 7 is basically identical to that shown in FIG. 4, except that the row drive lines, the column drive lines, and the lines for supplying the power supply potential to the wells extend in a zigzag manner. In FIG. 7, the lower-left square region 14" of the rectangular control element 14 is an N-well region, while the upper-right square region 14" is a P-well region. FIG. 7 also shows a power supply line 19 for supplying a ground potential to the P well. The layout configuration shown in FIG. 6 includes basic cells shown in FIG. 7 and three other types of basic cells formed by mirror-inverting the basic cell shown in FIG. 7.

With this wiring configuration, the illustrated display device 20 successively selects the row drive lines 16 while scanning the column drive lines 18 to display an image corresponding to video data. The control elements 14, and thus the pixel electrodes 12, are selected in the order of elements 1→element 2→element 3 as shown in FIG. 5, with a standard scanning sequence of the row and column drive lines 16 and 18. Unlike the display device 10 shown in FIG. 1, the display device 20 shown in FIG. 5 needs no operation for modifying the order of image data, and is thus treated in the same way as a conventional display device, such as shown in FIGS. 11 and 12.

In the exemplary display devices 10 and 20 of this invention, in principle, a one-to-one correspondence is assured between the pixel electrodes 12 and the control elements 14. However, a plurality of types of cells of control elements 14 may be used in a two-to-two or, more generally, plural-to-plural correspondence with the pixel electrodes 12, and this structure may be periodically arranged. As long as the pixel electrode 12 partly overlaps the corresponding control element 14, there is no other requirement in the positional relationship between the pixel electrode 12 and control element 14.

In the above-described embodiments shown in FIGS. 3 and 6, the pixel electrodes 12 are arranged with the same pitch in both the direction of rows and the direction of columns, while the control elements 14 are arranged in an array arranged in the first and second direction, respectively, at an angle with the directions of rows and columns.

This invention is not limited to this arrangement. The pixel electrodes 12 may alternatively be arranged in an array with the same pitch in the direction of rows and in the direction of columns, while the control elements 14 are arranged in an array with different pitches, one pitch in the direction of rows, and with the other pitch in the direction of columns.

Figure 8:
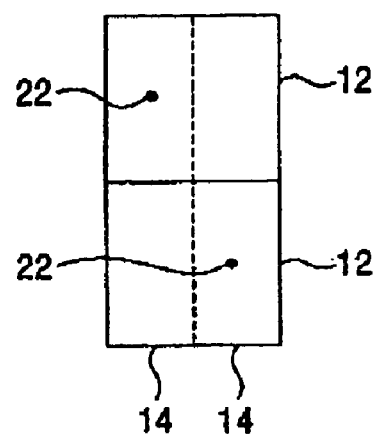
FIG. 8 shows the positional relationship between pixel electrodes and control elements in two pixels in the display device in an embodiment of the invention.

FIG. 8 is a conceptual view showing the positional relationship between pixel electrodes 12 and control elements 14 in two pixels in another exemplary embodiment of the display devices of this invention. As shown, two rows of pixel electrodes 12 are arranged correspondingly to a single row of the control elements 14. The pixel electrodes 12 have an aspect ratio of 1:1 and are arranged in an array with the same pitch in the directions of rows and columns. The control elements 14 of this embodiment are not inclined to the pixel electrodes 12, but have an aspect ratio different from that of the pixel electrode 12. That is, the control elements 14 have an aspect ratio of 4:1 and are arranged in an array with different pitches, one pitch in the direction of rows and the other pitch in the direction of columns.

The area of the square region 12 to form the pixel electrode is equal to the area of the rectangular region 14 to form the control element, and the pixel electrodes 12 partly overlap the corresponding control elements 14. In one words, the square of the arrangement pitch of the pixel electrodes 12 is equal to the product of the arrangement pitches of the control elements 14 in the directions of the rows and the columns. If the region to form the pixel electrode 12 has a rectangular shape, the product of the arrangement pitches of the pixel electrodes 12 in the directions of rows and columns is equal to the product of the arrangement pitches of the control elements 14 in the directions of rows and columns.

A combination of the two pixel electrodes 12 and the two control elements 14 shown in FIG. 8 is treated as a unit. Such units are periodically arranged in an array to construct the display device of this invention. As shown, the aspect ratio of the control element 14 is 4:1, and the pixel electrodes 12 and the control elements 14 combined in a two-to-two correspondence are periodically arranged.

Figure 9A:
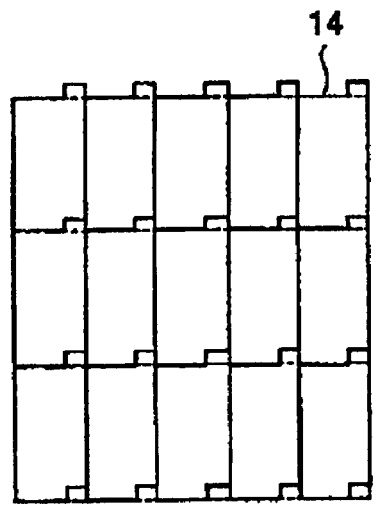
FIGS. 9A and 9B show the configuration of the control elements used in the display device of the invention.
Figure 9B:
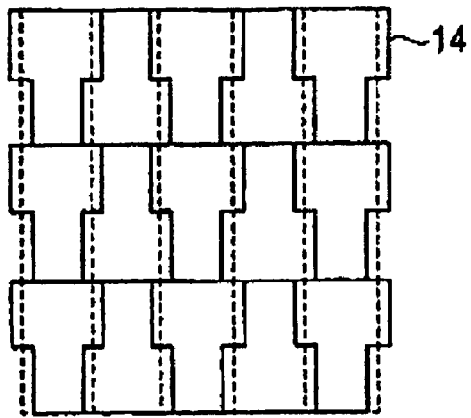
Figure 10A:
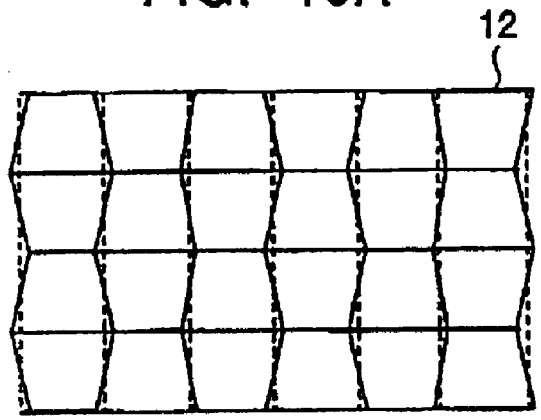
FIGS. 10A–10C show the configuration of the pixel electrodes used in the display device in one embodiment of the invention.
Figure 10B:
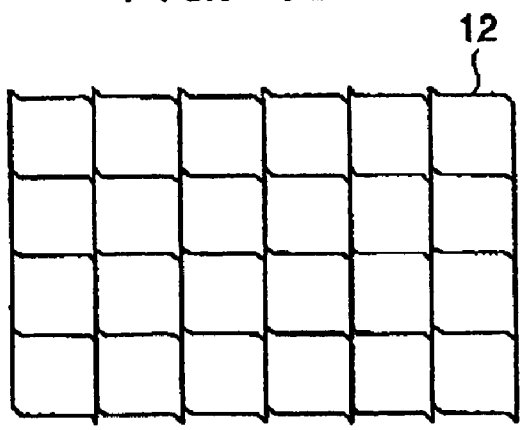
Figure 10C:
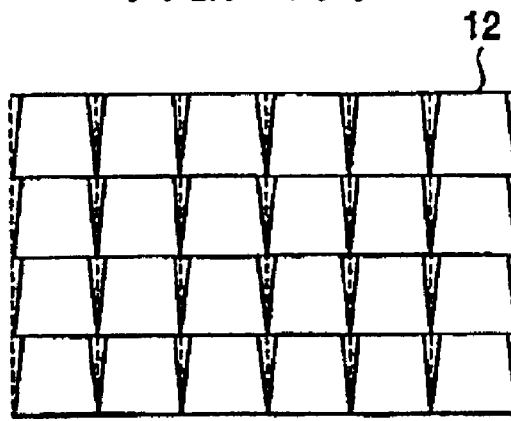

However, this invention is not limited to only this arrangement. Rather, depending on the aspect ratio of the control element 14, any suitable plural-to-plural correspondence between the pixel electrodes and the control elements can be adopted In this invention, the shape of the area to form the pixel electrode 12 is not limited to a square, and the shape of the area to form the control element 14 is not limited to a rectangular shape. Referring to FIGS. 9A–10C, variations of configurations of the pixel electrodes 12 and the control elements 14 are shown. In FIGS. 9A and 9B, solid lines represent areas to form control elements 14. In FIGS. 10A–10C, solid lines represent areas to form pixel electrodes 12.

The array of the control elements 14 includes any array, which may be regarded as an array of substantially rectangular shapes, even if the area to form the control element is not completely rectangular. Referring to FIGS. 9A and 9B, the areas surrounded by solid lines are variations of the rectangular-shaped unit cell areas represented by broken lines. Arrangements of control elements 14 shown in FIGS. 9A and 9B fall within the scope of this invention. There is no particular limitation on the shape of the control element 14. For example, a combination of triangles or pentagons may be periodically repeated.

Also, arrangements of pixel electrodes shown in FIGS. 10A–10C all fall within the scope of this invention. Shapes of the areas to form pixel electrodes represented by solid lines are mere variations of squares represented by broken lines.

The conventional switching circuit shown in FIG. 11 may be employed as the circuit arrangement of the control element in embodiments of this invention. The layout configuration of the control element 14 is not limited to any particular configuration and may be freely modified. In addition to the switching circuit, the control elements 14 may also include a capacitor.

As discussed above, in the display devices of this invention, an array of control elements is arranged to correspond to an array of pixel electrodes arranged in an upper layer even when miniaturization of the control elements does not permit the shape of the control elements in a lower layer to match the shape of the pixel electrodes. This invention thus provides a compact and high-resolution reflective-type display device, which is thus easy to design, and is appropriate for use in projectors and various other devices.

This invention is not limited to the above-described embodiments, and various changes and modifications may be incorporated in this invention without departing from the scope of this invention.

What is claimed is:

1. A display device, comprising:
    a semiconductor substrate;
    an array of control elements including drive lines formed on the semiconductor substrate; and
    an array of reflective pixel electrodes arranged in rows and columns, the array of pixel electrodes being stacked over the array of control elements so that each of the control elements controls a state of reflection of a corresponding one of the pixel electrodes, wherein:
    each of the reflective pixel electrodes has a substantially rectangular shape having a first aspect ratio, and the control elements are formed in respective second substantially rectangular regions defined by a crossing matrix of lines parallel to the drive lines and, closely arranged side-by-side, each of the second regions having a second aspect ratio different from the first aspect ratio; and
    the control elements are arranged (i) in a first direction that makes an angle greater than zero and smaller than 90° with a direction of the rows of the reflective pixel electrodes, and (ii) in a second direction perpendicular to the first direction.

2. The display device according to claim 1, wherein the state of reflection is controlled by one of (i) controlling alignment of a liquid-crystal layer disposed over the corresponding one of the pixel electrodes, and (ii) controlling an angle of the corresponding one of the pixel electrodes.

3. The display device according to claim 1, further comprising a converter that (i) receives a video signal including a series of image data in an order corresponding to the rows and columns of the pixel electrodes, and (ii) converts the order of the series of image data in the received video signal in accordance with correspondences between rows and columns of the array of control elements and the rows and columns of the pixel electrodes.

4. The display device according to claim 3, wherein the array of control elements includes first drive lines extending in the first direction and second drive lines extending in the second direction.

5. The display device according to claim 1, wherein the array of control elements includes row drive lines extending in a direction of the rows of the array of the pixel electrodes, and column drive lines extending in a direction of the columns of the array of the pixel electrodes.

6. A display device, comprising:
   a semiconductor substrate;
   an array of control elements arranged in rows and columns formed on the semiconductor substrate, the array of control elements including row drive lines and column drive lines formed on the semiconductor substrate; and
   an array of reflective pixel electrodes arranged in rows and columns with a first pitch and a second pitch, the array of pixel electrodes is stacked over the array of control elements so that each of the control elements controls a state of reflection of a corresponding one of the pixel electrodes:
   wherein the control elements are arranged in same directions as the rows and columns of the pixel electrodes with (i) a third pitch different from the first pitch, (ii) a fourth pitch different from the second pitch, and (iii) a product of the first and the second pitches is equal to a product of the third and the fourth pitches.

7. The display device according to claim 6, wherein the state of reflection is controlled by one of (i) controlling an alignment of a liquid-crystal layer disposed over the corresponding one of the pixel electrodes, and (ii) controlling an angle of the corresponding one of the pixel electrodes.

8. A method of making a display device, comprising:
   forming an array of control elements including drive lines formed on a semiconductor substrate; and
   forming an array of reflective pixel electrodes arranged in rows and columns, the array of pixel electrodes being stacked over the array of control elements so that each of the control elements controls a state of reflection of a corresponding one of the pixel electrodes, wherein:
   each of the reflective pixel electrodes has a substantially rectangular shape having a first aspect ratio, and the control elements are formed in respective second substantially rectangular regions, defined by a crossing matrix of lines parallel to the drive lines and arranged closely side-by-side, each of the second regions having a second aspect ratio different from the first aspect ratio; and
   the control elements are arranged (i) in a first direction that makes the an angle greater than zero and smaller than 90° with a direction of the rows of the reflective pixel electrodes, and (ii) in a second direction perpendicular to the first direction.

9. A method of making a display device, comprising:
   forming an array of control elements arranged in rows and columns on a semiconductor substrate, the array of control elements including row drive lines and column drive lines formed on the semiconductor substrate; and
   forming an array of reflective pixel electrodes arranged in rows and columns with a first pitch and a second pitch, the array of pixel electrodes being stacked over the array of control elements so that each of the control elements controls a state of reflection of a corresponding one of the pixel electrodes:
   wherein the control elements are arranged in same directions as the rows and columns of the pixel electrodes with (i) a third pitch different from the first pitch, (ii) a fourth pitch different from the second pitch, and (iii) a product of the first and the second pitches is equal to a product of the third and the fourth pitches.

10. The display device according to claim 1, wherein areas of the first and the second substantially rectangular regions are equal to each other.

11. The display device according to claim 1, wherein each of the pixel electrodes partly overlaps the corresponding one of the control elements.

12. The method according to claim 8, wherein areas of the first and the second substantially rectangular regions are equal to each other.

13. The method according to claim 8, wherein each of the pixel electrodes partly overlaps the corresponding one of the control elements.

14. The display device according to claim 6, wherein the reflective pixel electrodes are arranged in a line in each of the rows and columns.

15. The method according to claim 9, wherein the reflective pixel electrodes are arranged in a line in each of the rows and columns.

* * * * *